United States Patent
Schütz et al.

(10) Patent No.: US 12,358,472 B2
(45) Date of Patent: Jul. 15, 2025

(54) SERVICE STATION FOR IDENTIFYING THE DIRTINESS OF A VEHICLE COMPONENT, AND METHOD FOR OPERATING THE SERVICE STATION

(71) Applicant: Volkswagen Aktiengesellschaft, Wolfsburg (DE)

(72) Inventors: Daniel Schütz, Lehre (DE); Maik Otremba, Braunschweig (DE); Stephan Herold, Braunschweig (DE); Juan Mauricio Toro Ramos, Braunschweig (DE); Kristoph Toppel, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 515 days.

(21) Appl. No.: 17/615,023

(22) PCT Filed: May 8, 2020

(86) PCT No.: PCT/EP2020/062900
§ 371 (c)(1),
(2) Date: Nov. 29, 2021

(87) PCT Pub. No.: WO2020/239398
PCT Pub. Date: Dec. 3, 2020

(65) Prior Publication Data
US 2022/0234549 A1   Jul. 28, 2022

(30) Foreign Application Priority Data
May 28, 2019  (DE) .................. 102019207862.1

(51) Int. Cl.
*B60S 3/00* (2006.01)
*B25J 11/00* (2006.01)
(Continued)

(52) U.S. Cl.
CPC .......... *B60S 3/008* (2013.01); *B25J 11/0085* (2013.01); *B25J 19/021* (2013.01); *B25J 19/04* (2013.01)

(58) Field of Classification Search
CPC ...... B60S 3/008; B25J 11/0085; B25J 19/021; B25J 19/04
(Continued)

(56) References Cited

U.S. PATENT DOCUMENTS 8,719,998 B1 * 5/2014 Huffman ............. A47L 11/4002
15/319
11,009,602 B2   5/2021 Correia et al.
(Continued)

FOREIGN PATENT DOCUMENTS

CN    108569295 A    9/2018
DE    10110373 A1    9/2002
(Continued)

OTHER PUBLICATIONS

DE102014112123A1—machine translation (Year: 2014).*
(Continued)

*Primary Examiner* — Tinsae B Ayalew
(74) *Attorney, Agent, or Firm* — Peter Zura; LOZA & LOZA, LLP

(57) ABSTRACT

A service station for vehicles of an autonomous vehicle fleet. The service station includes at least one service module that is designed to identify the dirtiness of at least one vehicle component of the vehicle. The service module also includes at least one mobile robot and/or a robot arm on which a tool is arranged for identifying dirtiness. The tool includes at least one optical sensor and preferably at least one light source and/or at least one vapor emitter.

20 Claims, 4 Drawing Sheets

(51) Int. Cl.
*B25J 19/02* (2006.01)
*B25J 19/04* (2006.01)

(58) Field of Classification Search
USPC .......................................................... 134/123
See application file for complete search history.

(56) References Cited

U.S. PATENT DOCUMENTS

| 2011/0155192 | A1* | 6/2011 | Ahmad ..................... B60S 1/68 |
| | | | 134/56 R |
| 2017/0121019 | A1* | 5/2017 | Shin ..................... B25J 11/0085 |
| 2018/0164213 | A1* | 6/2018 | Windorfer ............ G01N 21/251 |

FOREIGN PATENT DOCUMENTS

| DE | 102014112123 A1 | 2/2016 |
| DE | 102014226358 A1 | 6/2016 |
| DE | 102017101508 A1 | 7/2017 |
| DE | 102017107937 A1 | 10/2017 |
| DE | 102017125484 A1 | 5/2018 |
| DE | 202017004032 U1 | 11/2018 |
| JP | S63234141 A | 9/1988 |
| WO | 2018033283 A1 | 2/2018 |

OTHER PUBLICATIONS

PCT/EP2020/062631. International Search Report (Jul. 6, 2020).
DE102019207862.1. Office Action (Nov. 16, 2020).
Corresponding Chinese Application No. 202080039398.3. Office Action (May 31, 2024).
Corresponding Chinese Application No. 202080039398.3. Second Office Action (Dec. 31, 2024).

* cited by examiner

SERVICE STATION FOR IDENTIFYING THE DIRTINESS OF A VEHICLE COMPONENT, AND METHOD FOR OPERATING THE SERVICE STATION

CROSS REFERENCE TO RELATED APPLICATION

The present application claims priority to International Patent App. No. PCT/EP2020/062900 to Schütz, et al, filed May 8, 2020, which claims priority to German Patent App. No 10 2019 207 862.1, filed May 28, 2019, the contents of each being incorporated by reference in their entirety herein.

FIELD OF TECHNOLOGY

The present disclosure relates to a service station for identifying a dirtiness of a vehicle component (vehicle dirtiness), in particular for identifying dirtiness of vehicle components in order to prepare for their automatic cleaning. The present disclosure also relates to a method for operating the service station, in particular for operating the service station to recognize dirtiness of at least one vehicle component and to subsequently clean the vehicle.

BACKGROUND

Today's vehicles already have a large number of assistance systems that provide computer-based support to the driver in a plurality of driving situations. Such assistance systems can rely on sensors for acquiring a plurality of measurement data, which by far exceed the capabilities of the human senses. In addition, the speed of these assistance systems significantly exceeds human reaction times. Known driver assistance systems are, for example, lane departure warning assistants, brake assistants in connection with pedestrian detection and adaptive cruise control systems, especially for traffic jam situations.

By using such assistance systems, the driver's autonomy with regard to their driving decisions is increasingly transferred to the vehicle or to the controllers operating in it. At the end of these developments, there is an autonomously driving vehicle that can maneuver completely without human intervention. A fully automated passenger transport is possible by means of such an autonomously driving vehicle.

So far, such autonomously driving vehicles have generally been registered in the names of individuals and/or they are not approved for use on public roads without additional monitoring by a driver. With regard to maintenance and care, these autonomously driving vehicles therefore differ little from other privately owned vehicles. As a rule, the owner(s) will take care of the maintenance and energy supply of the vehicle. However, a wide variety of mobility concepts already exist even today, especially in metropolitan areas. With so-called car sharing, a plurality of users access the vehicles of a vehicle fleet each independently of one another and for a limited period of time. Since the fleet vehicles are only tied to a specific user for the period of actual use, unused parking time of the vehicles can be minimized.

Car sharing concepts are also known for other vehicles such as bicycles, scooters or vans. Without being limited to passenger cars, reference will be made in the following to car sharing in a representative manner. In addition, the present disclosure can also be used in the context of ride pooling and ride hailing.

Furthermore, an autonomous vehicle fleet can denote a fleet of private vehicles that are temporarily made available for driving services, in particular for autonomous driving services. In the aforementioned cases, a fleet operator is understood to mean the provider of an application, wherein the application is being used to connect users and providers of driving services. Possibly, the fleet operator can be a vehicle manufacturer or a service partner of such a manufacturer.

A distinction is made in particular between centralized and decentralized car sharing concepts. Central car sharing concepts provide that the vehicle use must always be started and ended at fixed stations. Essentially, it is therefore a short-term classic vehicle rental. Decentralized car sharing concepts, on the other hand, provide that the vehicle use can be started and ended at any point within an operating area of the fleet provider. Particularly decentralized car sharing concepts have the potential to significantly reduce the number of vehicles required in total, since, once there is a sufficient number of users and vehicles, the fleet vehicles will be available in a self-organized manner and with sufficient density in the operating area.

In particular with decentralized car sharing concepts, however, the energy supply, maintenance, and care of the vehicles poses challenges. Refueling and cleaning of the fleet vehicles can be taken care of by employees of the fleet provider. However, this option increases the personnel costs and thus the costs of the car sharing concept significantly. Alternatively, the users of the autonomous vehicles can be prompted by appropriate incentives to carry out the necessary service trips. However, there is an associated risk of inadequate cleaning or vehicle breakdowns. In addition to preserving the operability of the individual vehicles, it is also necessary to maintain the functionality of the fleet. In particular, the decentralized car sharing concepts require a certain minimum number of vehicles that are ready for use at all times. This is the only way to ensure sufficient availability of vehicles for the users. But usability also relates to the cleanliness of the vehicles, both outside and inside, especially with regard to ensuring customer satisfaction. However, every cleaning measure limits the availability of the vehicles, which is why unnecessary cleaning must also be avoided.

SUMMARY

Some aspects of the present disclosure are directed to overcoming or at least mitigating the problems of the prior art and of providing a service station and a method for identifying vehicle dirtiness which enable the preparation of an automatic cleaning action of a fleet vehicle according to the present disclosure.

These aspects are described in the context of the independent claims. Preferred improvements are the subject of the dependent claims.

In some examples, a service station for a vehicle is disclosed, in particular a service station designed to autonomously carry out a service action on a vehicle, in particular on the vehicles of an autonomous vehicle fleet. For this purpose, the service station according to the present disclosure has at least one service module designed to autonomously identify dirtiness of at least one vehicle component of the vehicle. The service module herein is designed as a robot, or it has robotics means.

In particular, the service module has a mobile robot and/or a robot arm. The mobile robot is preferably designed to be introduced into the interior of the vehicle, particularly preferably through an open door or an open window of the vehicle. The preferably multi-articulated robot arm can preferably be introduced through an open door or an open window of the vehicle into the interior of the vehicle.

In some examples, at least one tool for identifying dirtiness is disposed on the mobile robot and/or on the robot arm. Herein, the tool can preferably be introduced into the interior of the vehicle by means of the mobile robot or by means of the robot arm. The tool has at least one optical sensor. By introducing the tool into the interior of the vehicle, an optical signal of at least one vehicle component can thereby advantageously be acquired, wherein a degree of dirtiness of the component can be advantageously determined based on the acquired optical signal.

In other words, the at least one optical sensor of the tool of the service station according to the present disclosure is designed for capturing a degree of dirtiness of the at least one vehicle component of the vehicle, in particular for capturing optical signals by means of which a degree of dirtiness of a vehicle component can be determined, for example, by means of a controller. The service station according to the present disclosure thus advantageously allows for the fully automated capturing of dirtiness of vehicle components, in particular of an interior of the vehicle.

In some examples, at least one optical sensor is designed for recording at least one image signal of the at least one vehicle component of the vehicle. According to this example, the optical sensor is particularly preferably a camera, a laser scanner and/or a sensor for detecting black light and/or UV radiation. In other words, the at least one optical sensor is preferably designed for detecting signals in a predetermined or adjustable wavelength range. The optical sensor is particularly preferably an optical sensor designed for recording photos and/or videos, that is to say time series of photos, of at least one vehicle component.

Using such photos and/or videos of vehicle components, suitable software can advantageously be used to reliably determine a dirtiness of vehicle components, for example, using image segmentation, image recognition and/or artificial intelligence. The at least one optical sensor is particularly preferably designed to acquire an image signal of the component from different viewing angles. Accordingly, dirtiness even of dark, non-reflective vehicle components can advantageously be determined with a high level of reliability on the basis of the acquired image signals.

In some examples, the at least one optical sensor of the tool is designed to detect a degree of reflection of at least one surface of a vehicle component. Dirtiness of reflective surfaces is usually accompanied by a reduction in the degree of reflection of the surface. Alternatively, a reflection coming from an otherwise non-reflective surface can indicate dirtiness of the surface. Thus, by acquiring the degree of reflection and recognizing local fluctuations thereof, it is possible to draw conclusions as to a localized dirtiness of a surface. Global dirtiness of a reflective surface can also be detected by comparing the measured degree of reflection with a predefined value. The optical sensor is particularly preferably designed to acquire a degree of reflection of light of different wavelengths, for example, of invisible wavelengths. Thus, advantageously, dirtiness that is not visible at all or made visible only with difficulty, for example, grease stains, urine stains or the like, can be reliably determined on the basis of the degree of reflection.

In some examples, the tool for identifying dirtiness of at least one vehicle component has at least one light source. This is preferably a lighting element for illuminating the vehicle components in preparation of the recording of at least one image signal of a vehicle component. The light source is likewise preferably designed as a luminous element for carrying out the acquisition of at least one degree of reflection.

For this purpose, the light source is particularly preferably designed to emit light of different wavelengths. The light source is particularly preferably designed to emit black light or UV light in order to better visualize dirtiness, in particular organic dirtiness. Also preferably, the at least one optical sensor is provided with at least one filter, which enables the selective detection of signals within certain wavelength ranges, for example, in order to detect only certain UV radiation as a band or high pass filter. The spectral properties of the at least one filter therein are preferably adapted to the spectral properties of the at least one light source. Thus, image signals can be acquired in different wavelength ranges by using a correspondingly configured light source and/or at least one filter that is correspondingly configured.

The acquisition of image signals is preferably a qualitative acquisition of the light that is reflected by a vehicle component, in particular the spatially resolved and/or frequency-resolved acquisition of the intensity of the reflected light. The determination of the degree of reflection is preferably a quantitative determination of the light that is reflected by a vehicle component, for example, a non-spatially resolved acquisition of the intensity of the reflected light. Particularly advantageously, the emitting of light of special wavelength ranges by means of the at least one light source is used synergistically for the subsequent cleaning, for example, for the disinfection of surfaces.

In some examples, a tool for identifying dirtiness of at least one vehicle component has at least one vapor emitter. Herein, the vapor emitter is designed to release water vapor and has, for example, a water tank or a water supply line, a heating element, and a nozzle. Alternatively, the vapor emitter has a vapor supply line and a nozzle, or the like. By vapor deposition on surfaces, any dirtiness of a given surface, in particular greasy dirtiness, can advantageously be clearly visualized. Accordingly, vapor deposition of surfaces is therefore preferably carried out prior to the acquisition of an optical signal with the at least one optical sensor. Particularly advantageously, the vapor emitter or the emitted vapor is used synergistically to clean surfaces, for example, upholstered surfaces, or the like.

In some examples, the tool has at least one moisture sensor. The tool also preferably has at least one air quality sensor. The moisture sensor is preferably designed to acquire a moisture content of vehicle components, for example, upholstery or floor coverings, or a moisture content of the air in the interior of the vehicle. By means of the at least one moisture sensor, it is thus advantageously detectable as to whether elements of the interior of the vehicle need to be dried. The air quality sensor is preferably designed to acquire a dust, fine dust, particle and/or pollen content of the air inside the interior of the vehicle. It can thus be determined, for example, whether anti-allergenic cleaning of the interior of the vehicle is necessary. By introducing the aforementioned sensors into the interior of the vehicle, it is therefore possible to acquire a plurality of information regarding a degree of dirtiness of the interior of the vehicle.

In some examples, a cleaning tool is disposed on the mobile robot and/or on the robot arm for carrying out an interior cleaning of at least one vehicle component. The at least one cleaning tool is preferably a vacuum cleaner nozzle, an upholstery brush, and/or an applicator for applying a cleaning agent. These tools are configured in a known manner and the action of attaching such cleaning tools to a mobile robot or a robot arm and controlling the same for autonomous cleaning is known to those skilled in the art.

In some examples, the service station is designed to be deployed in a service infrastructure for autonomous fleet vehicles. For this purpose, particularly preferably, the service station according to the present disclosure has a (second) communication module that is configured for communications with the vehicles and/or a server of a fleet operator. The (second) communication module is, for example, a WLAN or cellular module, and it is preferably designed to carry out Car2Car or Car2X communications. The second communication module is preferably designed to communicate in accordance with a communication protocol that is used by the first communication module and/or by the server.

The communication module of the service station according to the present disclosure is preferably designed to transmit a first message for identifying dirtiness of at least one vehicle component to a vehicle. In other words, the communication module is designed, in particular under the control of the controller, to actuate a fleet vehicle in such a way that said vehicle carries out and/or supports the identification of dirtiness. The action of supporting therein relates in particular to providing instructions for vehicle settings that simplify the acquisition of optical signals, which characterize a degree of dirtiness, by means of the at least one optical sensor. If the vehicle is instructed to carry out the identification of a degree of dirtiness at least partially by itself, for example, by using at least one camera that is disposed inside the vehicle, the communication module is, furthermore, preferably configured to receive a second message with information regarding a degree of dirtiness of at least one vehicle component, wherein said information is particularly preferably acquired by the vehicle itself.

The service station according to the present disclosure also preferably has a (second) controller that is configured to determine a service action be carried out on a vehicle. The (second) controller is designed, in particular, to determine the service action on the basis of information regarding a service requirement of the vehicle, in particular a degree of dirtiness of at least one vehicle component. The controller is also preferably designed to actuate the tool for identifying vehicle dirtiness, in particular the at least one optical sensor, the at least one light source and/or the at least one vapor emitter thereof. The controller is also preferably designed to evaluate the optical signals acquired by the at least one optical sensor and to determine at least one instance of dirtiness of a vehicle component on the basis of said at least one optical signal. In other words, the controller is designed to identify vehicle dirtiness relative to at least one vehicle component. For this purpose, the controller is designed, in particular, to control the mobile robot and/or robot arm, in particular to control the movements of the mobile robot and/or robot arm. The (second) controller is designed, in particular, to control the mobile robot and/or robot arm in such a way that they are introduced/brought into the vehicle or brought out/moved out of the vehicle 2. The (second) controller is particularly preferably designed to introduce the mobile robot and/or robot arm through an open door or an open window of the vehicle into the interior of the vehicle.

In some examples, the (second) controller of the service station according to the present disclosure is configured to determine, based on the identified degree of dirtiness, a cleaning action that is to be carried out on at least one vehicle component of the vehicle. In particular, the vehicle component that is to be cleaned and the type of cleaning are determined herein. If necessary, further framework conditions, for example, with respect to the upper material of the respective vehicle component and the respective cleaning agents and methods, which are permitted for said component, are determined. Furthermore, the second controller is preferably also configured to determine the cleaning action that is to be carried out on said component on the basis of information received by the vehicle by means of the (second) communication module of the service station.

Furthermore, the service station according to the present disclosure, in particular the controller, for example, using the communication module or the tool, is preferably designed to additionally acquire a plurality of details that are specific for a given vehicle. Particularly preferably, the controller is designed to acquire a vehicle type, a vehicle size, the vehicle components residing in the vehicle and their properties, setting values of adjustable vehicle components (vehicle seats, rear-view mirrors, etc.), and the like. The second controller is preferably designed to adapt the cleaning action on the basis of the additionally acquired vehicle-specific information. In addition, the service station according to the present disclosure preferably has further means for determining a further service requirement, such as means for reading out a fill level of an energy store of the motor vehicle and/or means for reading out an error message by the motor vehicle.

In some examples, the service station also has a control module that is located downstream of the service module. Said control module also has a tool for identifying dirtiness of at least one vehicle component, as already described above in reference to the service station. In other words, said control module is also designed to detect a degree of dirtiness of at least one vehicle component. However, this detection is used in particular to evaluate the quality of the cleaning action that was carried out beforehand. In particular, the actual state that is acquired by means of the control module can be compared with a target state that is the sought-after objective of said cleaning.

Another aspect of the present disclosure relates to a method for identifying the dirtiness of at least one vehicle component, which is carried out by a service station, as described above. Preferably, it is a method for identifying the dirtiness of at least one vehicle component of an autonomous vehicle operating in an operating area. In other words, the vehicles can be operated within the operating area by users for autonomous driving services, regardless of whether said vehicles are vehicles from a car sharing provider or private vehicles. The infrastructure necessary for autonomous driving operation of the vehicles is thus available at least in the operating area.

Particularly preferably, the operating area has at least one service station that is equipped for identifying the dirtiness of at least one vehicle component of the vehicle. Furthermore, at least one server is configured for communicating with the at least one autonomous vehicle and the at least one service station. The method according to the present disclosure is preferably implemented in such an operating area.

In a first step of the method according to the present disclosure, the mobile robot is inserted into the vehicle and/or the robot arm is retracted into the vehicle. These steps obviously take place after the vehicle has arrived at the service station and under the control of the controller. This step preferably further includes instructing the vehicle, by means of the communication module, to open at least one vehicle window and/or at least one vehicle door. Likewise, it is preferred for the vehicle door to be opened by the robot arm itself. The mobile robot is preferably also inserted into the vehicle by means of a robot arm. Alternatively, the mobile robot is designed to enter the opened vehicle automatically, and, for this purpose, under the control of the controller, it is possibly lifted by means of a lifting device.

In a next step of the method according to the present disclosure, a degree of dirtiness of at least one vehicle component of the vehicle is acquired by means of the at least one optical sensor of the tool. In particular, at least one optical signal of the at least one vehicle component is acquired by means of the at least one optical sensor. Herein, the at least one optical signal is preferably an image signal or a degree of reflection of at least one vehicle component. This at least one acquired optical signal is subsequently evaluated by means of the controller of the service station according to the present disclosure. The degree of dirtiness can be finally determined on the basis of the evaluated signal. Therefore, the method according to the present disclosure advantageously enables the fully automated determination of a degree of dirtiness of at least one vehicle component, for example, of an autonomous fleet vehicle that visits a service station according to the present disclosure in regular cycles.

In some examples, a first message for identifying dirtiness of at least one vehicle component is furthermore transmitted to a vehicle. In other words, a fleet vehicle is actuated by means of the first message in such a way that it carries out and/or supports the identification of dirtiness. The supporting action relates in particular to providing instructions for vehicle settings that simplify the acquisition of optical signals, which characterize a degree of dirtiness, by means of the at least one optical sensor, such as, for example, the showing of a completely white background by means of a display, switching on vehicle-internal lighting, releasing vapor, etc. If the vehicle is instructed to carry out the identification of a degree of dirtiness at least partially by itself, for example, by using at least one camera that is located in the vehicle, preferably, the communication module is further configured to receive a second message with information on a degree of dirtiness of at least one vehicle component, wherein said information is particularly preferably acquired by the vehicle itself.

In some examples, a cleaning action that is to be carried out on the vehicle is also determined on the basis of the acquired degree of dirtiness of the at least one vehicle component. The acquired degree of dirtiness therein represents a property of a state of a vehicle, wherein it indicates that an actual state of the dirtiness of the vehicle deviates from a target state of the same. Herein, the target state can apply for all vehicles, or it can be defined individually for one specific vehicle, for example, by a user or owner of the vehicle. The determined cleaning action is therefore, in the most general sense, an action upon the vehicle in order to transfer said vehicle from the present actual state of dirtiness thereof to a desired target state thereof. Particularly preferably, a type of cleaning is preferably determined on the basis of the degree of the determined degree of dirtiness. It is further preferred to determine a level of cleaning on the basis of a degree of the determined dirtiness. For example, the degree of dirtiness is used to determine which vehicle component is to be cleaned and, for example, as to whether the vehicle component is to undergo dry-cleaning or wet-cleaning.

In some examples, the cleaning that has been determined is carried out, partially or fully autonomously, at the service station. The cleaning action therein takes place particularly preferably with the at least one cleaning tool of the service station. For example, a vacuum cleaner nozzle is used to vacuum a vehicle component, and a means for applying a cleaning agent is used to clean the display. A method according to the present disclosure advantageously provides that prior to the actual cleaning, at least one available service module of the service station is determined for performing the determined cleaning. A service module therein is a functional assembly of the service station that is designed to carry out cleaning of at least one vehicle component. The service station preferably has a plurality of such service modules. The available service module is preferably selected on the basis of the cleaning action that is to be carried out and on the basis of information regarding occupancy or full utilization of the service modules residing in the service station. The determined cleaning is then preferably carried out by means of the determined service module, and particularly preferably fully automatically.

In some examples, a degree of cleaning of the at least one vehicle component is also acquired. This acquiring action is preferably carried out by means of a control module, which, preferably, likewise has a tool with at least one optical sensor, as the service station according to the present disclosure. Furthermore, the degree of cleaning of the at least one vehicle component is preferably acquired by means of at least one optical sensor of the tool of the service station according to the present disclosure, in particular as described above.

In some examples, there occurs, furthermore, a comparison of the acquired degree of cleaning with the acquired degree of dirtiness or with a predetermined target regarding the cleaning that is carried out. In other words, the degree of dirtiness after the cleaning action is compared with the degree of dirtiness before the cleaning action, or with a desired result of the cleaning action. On the basis of this comparison, a level of effectiveness of the cleaning action that is carried out is preferably determined, for example, as the ratio of the degree of dirtiness relative to the degree of cleaning and the degree of dirtiness acquired before the cleaning action. The quality of the cleaning action that was carried out can be advantageously quantified on the basis of the determined level of effectiveness.

The level of effectiveness is particularly preferably compared with a predetermined limit value, that is to say a predetermined limit value for the level of effectiveness. If the level of effectiveness is equal or greater than the predetermined limit value, the autonomous cleaning of the vehicle has been completed successfully. However, if the level of effectiveness is less than the predetermined limit value, the cleaning action is repeated using the first service module and/or the second service module. As an alternative or in addition, an error message is output, for example, if, after the cleaning action was repeated, second information was acquired which corresponds to an insufficient level of effectiveness.

The method steps of the method according to the present disclosure can be implemented by means of electric or electronic parts or components (hardware), by firmware (ASIC), or they can be realized by executing a suitable program (software). Likewise preferred, the method according to the present disclosure is realized or implemented by means of a combination of hardware, firmware and/or software. For example, individual components for executing individual method steps are designed as a separately integrated circuits, or they are arranged on a common integrated circuit. Furthermore, individual components configured to carry out individual method steps are preferably arranged on a (flexible) printed circuit carrier (FPCB/PCB), a tape carrier package (TCP) or on another substrate.

The individual method steps of the method according to the present disclosure are also preferably designed as one or more processes that run on one or more processors in one or more electronic computing devices, and that are generated when one or more computer programs are executed. The computing devices therein are preferably designed to work together with other components, for example, a communication module and one or more sensors or cameras, in order to realize the functionalities as described herein. The instructions of the computer programs therein are preferably stored in a memory, such as, for example, a RAM element. However, the computer programs can also be stored in a non-volatile storage medium such as a CD-ROM, a flash memory, or the like.

A person skilled in the art also appreciates that, without deviating from the method according to the present disclosure as described above, the functionalities of several computers (data processing devices) can be combined, or that they can be combined in a single device, or that the functionality of a specific data processing device can be distributed across a plurality of devices in order to carry out the steps of the method according to the present disclosure.

The methods according to the present disclosure is preferably carried out within a system for performing a service action on a vehicle. The system for performing a service action has at least one autonomously driving vehicle which has at least one first sensor designed to acquire surroundings data and at least one second sensor designed to acquire vehicle data. Accordingly, the at least one first sensor allows for information on the surroundings or the environment to be acquired, and the at least one second sensor allows for vehicle-specific information to be acquired. The vehicle further has a driving system designed to carry out autonomous driving maneuvers, which is preferably designed for complete transverse and longitudinal guidance of the vehicle.

Furthermore, the vehicle has a (first) communication module configured to establish at least one communications link. The communication module is preferably a WLAN or cellular module, and it is preferably designed to carry out Car2Car or Car2X communications. The vehicle also has an energy store, for example, a battery system, and/or a fuel or hydrogen tank. The vehicle further has a controller for executing method steps.

The system also has at least one service station according to the present disclosure, as described above. The system also has a plurality of service modules designed for autonomously executing a service action, in particular the cleaning of a vehicle component of the vehicle. For this purpose, the service modules are arranged inside the service station, for example, in different areas of a building, or they are associated with the service station, for example, in different sections of a building. Herein, each service module has a third communication module. The third communication module is preferably a WLAN or cellular module, and it is preferably designed to carry out Car2Car or Car2X communications. Each service module preferably has a third controller, which is designed to carry out the method steps of the service module in the context of the method according to the present disclosure. Furthermore, each service module has one or more means for carrying out a cleaning action.

The at least one service module particularly preferably has at least one first service module designed to carry out a cleaning of at least one vehicle component of the vehicle. The first service module preferably has a mobile robot and/or a robot arm that has disposed thereon a tool for identifying the degree of dirtiness of at least one vehicle component. In addition, the mobile robot or robot arm preferably carries, furthermore, tools that are suitable and designed for cleaning the interior of the vehicle. The robot arm is preferably designed to be introduced through an open door or an open window of the vehicle into the interior of the vehicle. The mobile robot is preferably designed to be brought through an open door or an open window of the vehicle into the interior of the vehicle. The further tools are, for example, a vacuum cleaner nozzle, an upholstery brush, an applicator for applying cleaning agent, and/or the like.

Also preferably, the at least one service module has at least one second service module that is designed to carry out an external cleaning of the vehicle. The second service module is preferably designed like an automatic car wash, as known from the prior art, and preferably has nozzles for applying at least one cleaning fluid, brushes or rags for removing dirt from the vehicle, and/or a blow drier for drying the vehicle. Particularly preferably, the second service module moreover has further washing elements, such as, for example, brushes specifically designed for rim cleaning and/or means for wax application. Also preferably, the second service module has means for transporting the vehicle in the module.

As an alternative or in addition, also preferably, the service station has at least one third service module that is designed to fill the energy store of the vehicle. For this purpose, the third service module has, in particular, its own energy store, for example, a battery or a fuel tank, or a connection to a corresponding supply network, for example, to a power grid or to a fuel supply line. Furthermore, the third service module has a connection module for establishing a connection with a refill element of the vehicle. The refill element of the vehicle is, for example, a tank nozzle or a charging socket. Furthermore, the connection module preferably has a robot arm, which has a filling element adapted to the refilling element of the vehicle. The filling element is advantageously connected to the energy store via a supply line. The third service module is particularly preferably designed for hybrid vehicles and has, for example, a first filling element, which is connected to the power grid, for connection to a charging socket of the vehicle and a second filling element, which is connected to a fuel supply line, for connection to a tank nozzle of the vehicle.

Furthermore, the service station of the system preferably has a fourth service module designed for changing the tires of the vehicle in order to carry out a service action. The fourth service module therein has a store for a plurality of spare wheels and an automatic shelving system or the like for automatically removing a set of spare wheels from the store. Furthermore, the fourth service module preferably has a robot arm for automatically changing the tires of the vehicle with the spare wheels.

The system also preferably has at least one server configured for communicating with the at least one autonomous vehicle and at least one service station. The server is preferably a server in a data center of a provider of car sharing services (fleet operator), a provider of cleaning services, or a vehicle manufacturer. In particular, the server has a (fourth) communication module designed as a WLAN or cellular module and preferably designed for executing Car2Car or Car2X communications. The server is also designed to relay communications between the vehicle and the service station. In other words, the server is designed to forward data received from the service station or from the vehicle to the vehicle or to the service station.

Also preferably, the server is designed to determine full utilization of an autonomous vehicle fleet. Herein, the vehicle described with reference to the method according to the present disclosure is part of the autonomous vehicle fleet. The server is configured for communicating with the autonomous vehicles. According to a preferred embodiment, a utilization of the autonomous vehicle fleet is determined by the server and based on utilization data generated by the vehicles. The utilization data therein can take into account the number of user requests, average travel times, and travel distances. Additional information that makes a high demand likely can also be taken into account, such as the beginning and end of a major event, such as a sporting event, concert, etc.

Further preferred configurations of the present disclosure will become apparent from the other features mentioned in the dependent claims. The various embodiments of the present disclosure mentioned in this application can be advantageously combined with one another, unless specified to the contrary for individual cases.

BRIEF DESCRIPTION OF THE DRAWINGS

The present disclosure is explained below in exemplary embodiments with reference to the appended drawings.

DETAILED DESCRIPTION

Figure 1:
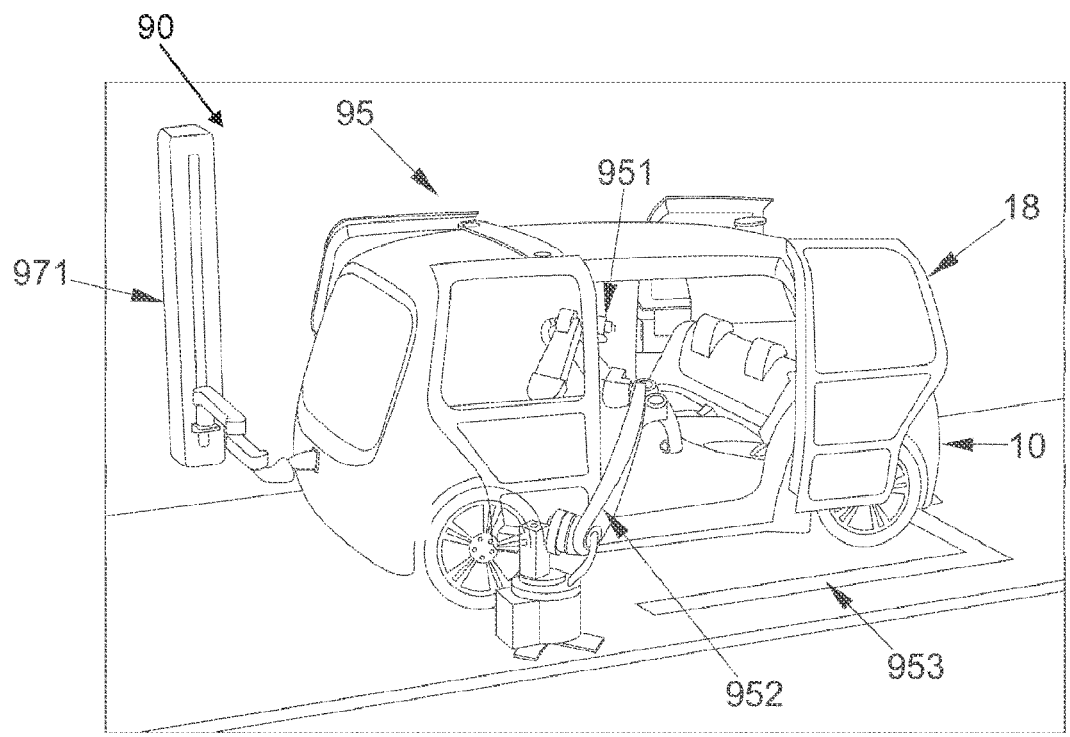
FIG. 1 shows a schematic representation of a service station according to some aspects of the present disclosure.

FIG. 1 shows a schematic representation of a service station according to the present disclosure, in particular a first service module 95 for identifying vehicle dirtiness of at least one vehicle component of the vehicle 10. In order to carry out an identification of dirtiness of at least one vehicle component on the vehicle 10, the latter moves into the service module 95 in order to come to a stop therein, in a stop position 953. As soon as the vehicle 10 comes to a standstill in the stop position 953, the vehicle doors 18 of the vehicle 10 open automatically. Preferably, this is caused by the controller 92 of the first service module 95, which communicates directly with the controller 40 of the vehicle 10. As soon as the vehicle doors 18 are open, a first robot arm 951 and a second robot arm 952 are introduced into the vehicle 10. Alternatively, the service module 95 can have a mobile robot, which is not shown in FIG. 1.

Figure 2:
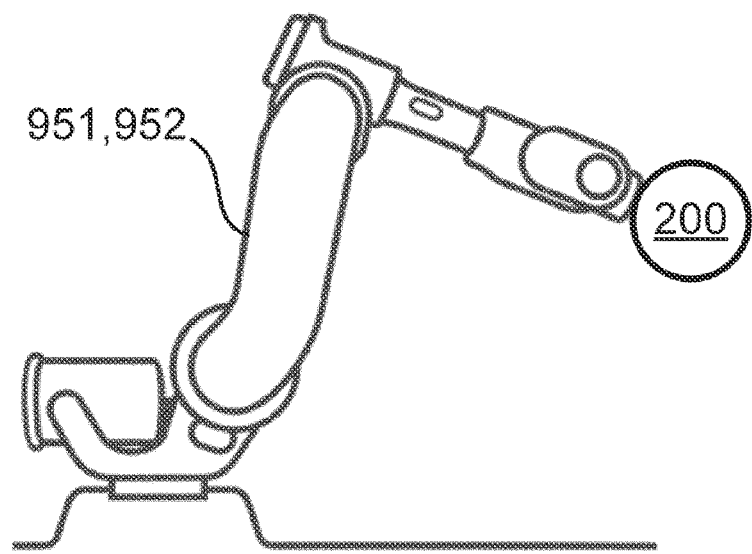
FIG. 2 shows a schematic representation of a robot arm of the service station according to some aspects of the present disclosure.

FIG. 2 shows a schematic representation of such a robot arm 951, 952 with a tool 200 disposed thereon for identifying vehicle dirtiness. The robot arm 951, 952 also has several articulations and several actuators connected to said articulations. The robot arm 951, 952 is thus, furthermore, able to adopt complex geometries. In particular, the robot arm 951, 952 can penetrate the interior of the vehicle, through an open vehicle window or an open vehicle door, and thus bring the tool closer to various vehicle components.

In addition, further tools for carrying out interior cleaning can be disposed on the robot arms 951, 952, such as, for example, a vacuum cleaner nozzle (not shown), an applicator for applying a cleaning agent and means for upholstery cleaning. The first service module 95 as shown in FIG. 1 also has a charging terminal 971 for filling up the electric energy store 36 of the vehicle 10.

Figure 3:
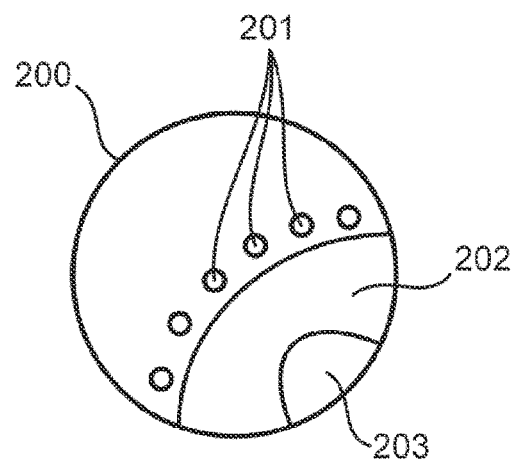
FIG. 3 shows a schematic representation of a tool for identifying at least one vehicle dirtiness according some aspects of the present disclosure.

FIG. 3 shows a schematic representation of a tool 200 for identifying the dirtiness of at least one vehicle component at least according to one embodiment. According to said embodiment, the tool 200 is, in essence, spherically configured and, as illustrated schematically in FIG. 2, designed to be fastened to a free end of a robot arm 951, 952. The fastening of the spherical tool 200 to the robot arm 951, 952 is preferably such that the tool 200 is configured as rotating or pivoting in any direction by means of a ball joint. Accordingly, this serves to facilitate approaching a plurality of different vehicle components. The tool 200 has means for identifying dirtiness on at least one vehicle component, in particular a vapor emitter 201, a light source 202, and an optical sensor 203.

The tool 200 is preferably designed to illuminate at least one vehicle component, using the light source 202 with light of a specific wavelength, and to acquire a portion of the light reflected by the vehicle component with the optical sensor 203. Depending on the wavelength range and the spatial resolution in relation to the detected signal, said signal is representative of local or global dirtiness of the at least one vehicle component. For example, UV light can be used to record an image signal of urine stains, and/or measuring a degree of reflection of light allows for drawing the conclusion that a surface is covered with dust. Further, the vapor emitter 201 can be used to deposit water vapor onto at least one surface of a vehicle component in order to visualize dirt thereon, in particular greasy dirt. The vapor emitters 201 are arranged, in particular, along a joint gap between the oscillating body and the remaining surface of the spherical tool and designed to deposit vapor.

Figure 4:
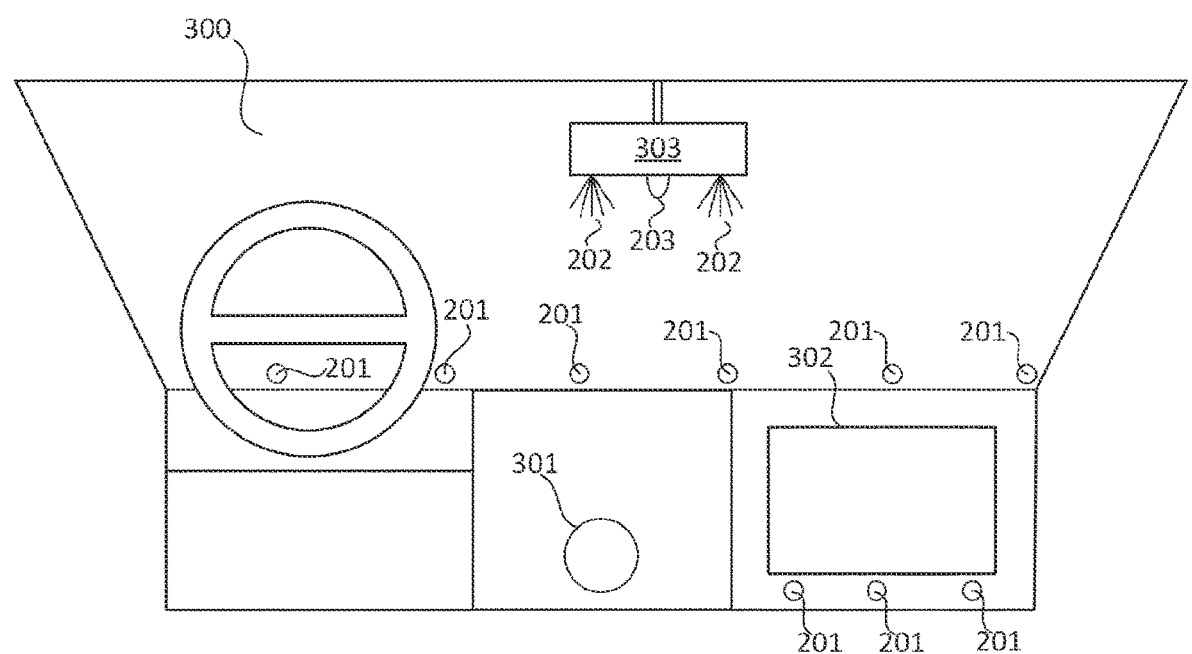
FIG. 4 shows a schematic representation of an interior of a vehicle with means for identifying at least one vehicle dirtiness according to some aspects of the present disclosure.

FIG. 4 shows a schematic representation of an interior of a vehicle having a vehicle window 300, in particular a windshield 300, an operating element 301, in particular a rotary control 301, and a display 302, in particular a touchscreen 302. According to an embodiment, the service station according to the present disclosure 90 transmits a first message to a vehicle 10, which requests the vehicle 10 to support an identification of dirtiness of at least one vehicle component. For this purpose, a plurality of vapor emitters 201, as already described above, are arranged in the vehicle interior of the vehicle 10, as shown in FIG. 4, along a lower edge of the windshield 300. Further vapor emitters 201 are arranged below the display 302. By releasing vapor by means of the vapor emitter 201, greasy dirtiness on the windshield 300 or the display 302 can be better visualized, whereby their acquisition by means of at least one optical sensor 203 is facilitated. In response to the first message, all displays of the vehicle 10 also present a white background to improve lighting and to promote the detectability of dirtiness. Alternatively, according to one embodiment, the service station 90 according to the present disclosure transmits a first message to a vehicle 10 which requests the vehicle 10 to carry out an identification of dirtiness for at least one vehicle component. For this purpose, the vehicle 10 has an optical sensor 203 that is disposed in a rearview mirror 303, as well as several light sources 202 arranged in the rearview mirror. The light sources 202 emit light of a specific wavelength onto the windshield 300, for example, and the optical sensor 203 acquires the reflected portion of the light to determine a degree of dirtiness.

Figure 5:
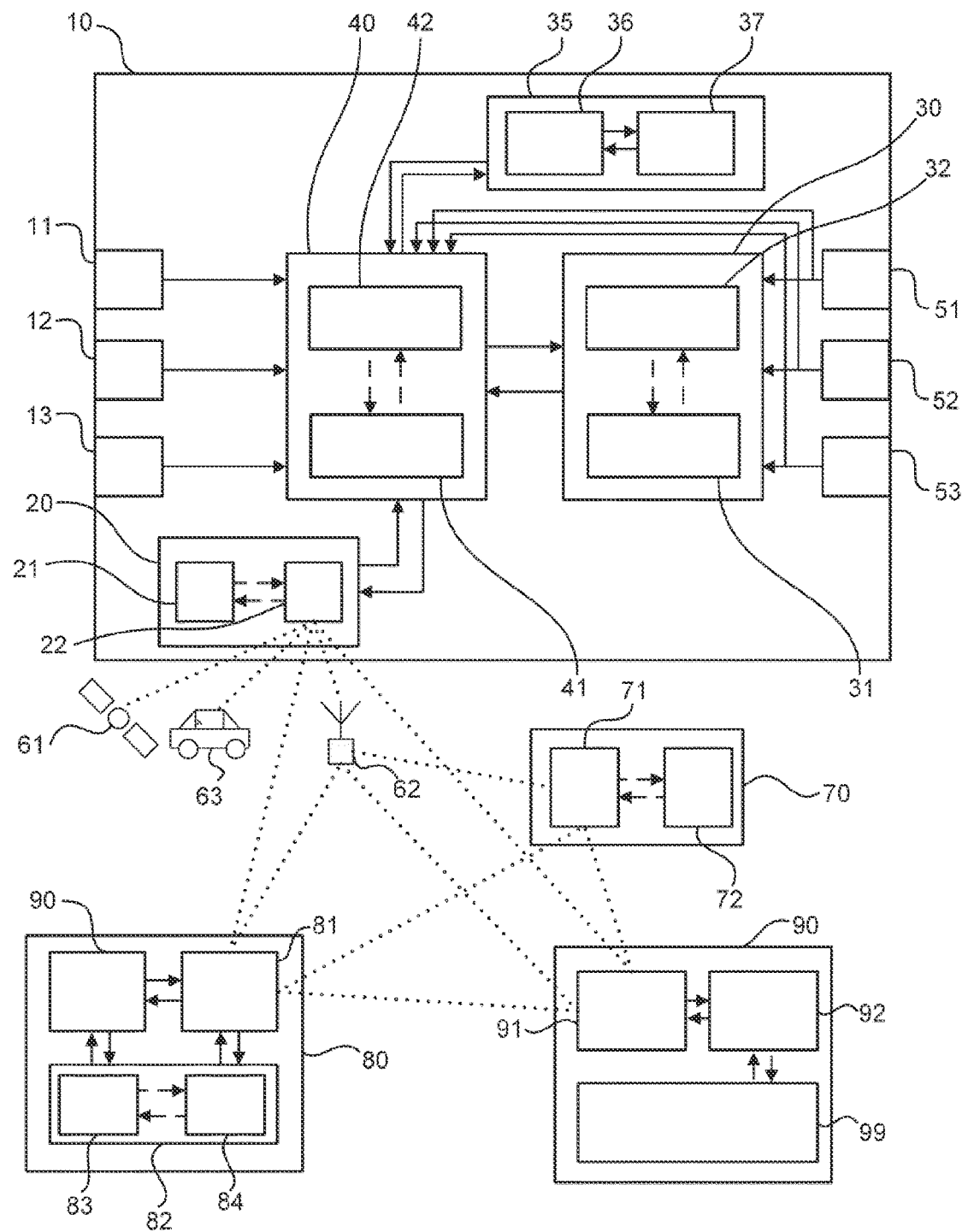
FIG. 5 shows a schematic representation of a system for carrying out the method according to the invention, having an autonomous vehicle, a service station with a service module and a server according to some aspects of the present disclosure.

FIG. 5 shows a schematic representation of a system for carrying out a service action on the motor vehicle 10, in particular for identifying dirtiness of a vehicle component. The system has an autonomous vehicle 10, a server 70, a service station 80, and a service module 90, in particular as described with reference to FIGS. 1 to 3.

FIG. 5 shows a two track vehicle 10 with an electric motor 37, which has a plurality of first sensors, in particular a first sensor 11, a second sensor 12, and a third sensor 13. The first sensors 11, 12, 13 are configured to acquire surroundings data of the vehicle 10 and include, for example, temperature sensors for acquiring an ambient temperature, a camera for acquiring an image of an environment immediately surrounding the vehicle 10, a microphone for acquiring noises of an environment immediately surrounding the vehicle 10, distance sensors such as, for example, ultrasonic sensors for acquiring distances to objects surrounding the vehicle 10. The first sensors 11, 12, 13 transmit the signals concerning the surroundings that they acquired to a first controller 40 of the vehicle 10.

The vehicle 10 also has a plurality of second sensors, in particular a fourth sensor 51, a fifth sensor 52, and a sixth sensor 53. The second sensors 51, 52, 53 are sensors for determining status data relating to the vehicle 10 itself, such as, for example, current position and movement information of the vehicle 10. The second sensors 51, 52, 53 are consequently, for example, speed sensors, acceleration sensors, inclination sensors, interior motion detectors, pressure sensors in the vehicle seats, or the like.

In addition, at least some of the second sensors 51, 52, 53 are designed to acquire a degree of dirtiness of the vehicle 10. The second sensors 51, 52, 53 configured for this purpose include, for example, an interior camera for acquiring image signals of the interior of the vehicle, a dashboard camera for acquiring image signals of the engine hood, a camera in a side mirror for acquiring image signals of a side door of the vehicle, and other sensors for acquiring dirtiness, for example, based on a degree of reflection of the vehicle paint, or the like. The second sensors 51, 52, 53 transmit the status signals they acquired to the first controller 40 of the vehicle 10. In addition, at least some of the second sensors 51, 52, 53 transmit their measurement results directly to a driving system 30 of the vehicle 10.

The vehicle 10 also has a first communication module 20 with a memory 21 and one or more transponders, or transceivers 22. The transponders 22 are radio, WLAN, GPS or Bluetooth transceivers, or the like. Also preferably, the transponder 22 is designed for communicating via cellular networks, such as, for example, an LTE, LTE-A or 5G cellular network. The transponder 22 communicates with the internal memory 21 of the first communication module 20, for example, via a suitable data bus. By means of the transponder 22, for example, it is possible to determine the current position of the vehicle 10 via communication with a GPS satellite 61, which is then stored in the internal memory 21. Likewise, authorization information stored in the memory 21 can be transmitted to an external communication module by means of the transponder 22. The first communication module 20 communicates with the first controller 40.

Furthermore, the first communication module 20 is configured to communicate with a server 70, in particular a fourth communication module 71 of the server 70, for example, via a UMTS (Universal Mobile Telecommunication Service) or LTE (Long Term Evolution) cellular network. The first communication module 20 is also configured to communicate with a second communication module 81, a service station 80, and with a third communication module 91 of a service module 90. The first communication module 20 is also configured to communicate with a (fourth) communication module of a cleaning robot 100. The communication preferably occurs directly via $V_2X$ communications or via a cellular network. The communication via the cellular network occurs via one or more base stations 62.

The vehicle 10 also has the driving system 30 which is configured for fully autonomous driving operation, in particular for longitudinal and lateral control, of the motor vehicle 10. The driving system 30 has a navigation module 32 which is configured to calculate routes between a starting point and a destination point and to determine the maneuvers to be carried out by the vehicle 10 along this route. In addition, the driving system 30 includes an internal memory 31, for example, for map materials, and which communicates with the navigation module 32, for example, via a suitable data bus. At least some of the second sensors 51, 52, 53 of the vehicle 10 transmit their measurement results directly to the driving system 30. These data transmitted directly to the driving system are in particular, current position and movement information of the vehicle 10. Said data are preferably acquired by speed sensors, acceleration sensors, inclination sensors, etc.

The vehicle 10 also has an electric driving system 35 which provides the functionalities that are necessary for the electric drive of the vehicle 10. In particular, the electric driving system 35 has an electric energy store 36, which supplies an electric motor 37 with the electric energy required to drive the vehicle 10. The electric driving system 35 also has a charging device (not shown) for charging the electric energy store 36. The vehicle 10 can also be a hybrid vehicle which has a hydrogen tank for supplying a fuel cell system disposed inside the vehicle 10.

The vehicle 10 also has a first controller 40, which is configured to carry out method steps of the vehicle in order to execute a service action. For this purpose, the first controller 40 has an internal memory 41 and a CPU 42, which communicate with one another, for example, via a suitable data bus. In addition, the first controller 40 is communicatively linked to at least the first sensors 11, 12, 13, the second sensors 51, 52, 53, the first communication module 20 and the driving system 30, for example, via one or more respective CAN connections, one or more multiple respective SPI connections, or other suitable data connections.

The system for carrying out the method according to the present disclosure also preferably has a server 70. The server 70 is preferably operated by a fleet operator of an autonomous vehicle fleet, for example, as part of a car sharing concept, by a service provider for vehicle cleaning and/or by a vehicle manufacturer. The server 70 has a fourth communication module 71 which is configured for communications using the same protocol as the first communication module 20 of the vehicle 10. The server 70 also has a fourth controller 72. The system for carrying out a service action also has a service station 80 and at least one service module 90.

The service station 80 has a second communication module 81 designed for communications with the first communication module 20 of the vehicle 10, for communications with the fourth communication module 71 of the server 70 and for communications with the third communication module 91 of a service module 90. In particular, the second communication module 81 is configured for communications using the same protocol as the first communication module 20 of the vehicle 10, as the fourth communication module 71 of the server 70, and as the third communication module 91 of the service module 90.

In addition, the service station 80 has a controller 82 which has a memory 83 and a CPU 84, and they communicate with one another via a suitable data bus, for example, a CAN bus or SPI bus. The service station 80 also has at least one service module 90, preferably several service modules 90. The components of the service module 90 resemble those of the service module 90 that will be explained below. Service station 80 thus has at least one service module 90, and/or it is associated with at least one independent service module 90.

Each of the service modules 90 is designed for communications with the second controller 82. The second controller 82 is designed to carry out said steps of the method according to the present disclosure that are carried out by the service station 80 in communication with the second communication module 81 and the at least one service module 90. The second controller 82 is designed, in particular, to carry out the steps of the service station 80 according to the present disclosure.

A system according to the present disclosure has at least one service module 90. The service module 90 has a third communication module 91, which designed for communications with the first communication module 20 of the vehicle 10, for communications with the fourth communication module 71 of the server 70, and for communications with the second communication module 81 of the service station 80. In particular, the third communication module 91 is configured for communications using the same protocol as the first communication module 20 of the vehicle 10, as the fourth communication module 71 of the server 70, and as the second communication module 81 of the service station 80.

In addition, the service module 90 has a third controller 92, which, for example, has a memory and a CPU, and the latter communicate with one another via a suitable data bus, for example, a CAN bus or SPI bus.

Figure 6:
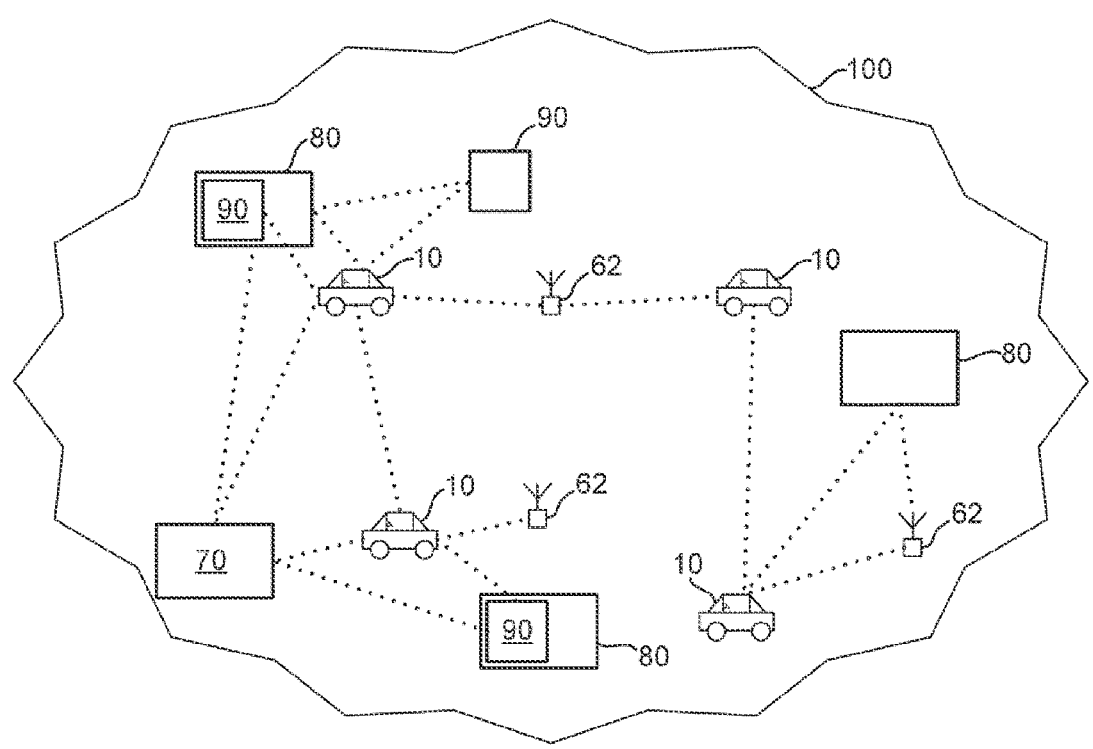
FIG. 6 shows a schematic representation of an operating area for carrying out a method according to some aspects of the present disclosure.

FIG. 6 shows a schematic representation of an operating area 100 for carrying out the methods according to the present disclosure using the system as shown in FIG. 5. The operating area 100 preferably extends over a metropolitan area, for example, a city or a downtown area of a city. Within the operating area 100, there exist a plurality of autonomous vehicles 10, each of which has a basic configuration, as explained previously in reference to FIG. 5. Each of the autonomous vehicles 10 therein can be retrieved by users of a car sharing service, or given vehicles are permanently assigned to specific users.

The operating area 100 has a plurality of service stations 80 and service modules 90. Furthermore, a server 70 is arranged in the operating area 100. The autonomous vehicles 10 are designed for communications with one another, in particular by means of the first communication modules 20 and via base stations 62 of a cellular network. The vehicles 10 are also designed for communications with the service stations 80, the service modules 90, and the server 70. The communications occur directly between these elements, or via base stations 62 of a cellular network. In addition, the other components of the system, as shown in FIG. 5, are designed for direct or indirect communications with one another, for example, a service station 80 with the server 70 and service modules 90, and the server 70 with the service modules 90. In FIG. 6, connections are indicated with the dashed lines.

LIST OF REFERENCE NUMERALS

10 motor vehicle
11 first sensor
12 second sensor
13 third sensor
18 vehicle door
20 first communication module
21 memory
22 transponder
30 driving system
31 memory
32 CPU
35 electric driving system
36 electric energy store
37 electric motor
40 first controller
41 memory
42 CPU
51 fourth sensor
52 fifth sensor
53 sixth sensor
61 GPS satellite
62 cellular station
63 other vehicle
70 server
71 fourth communication module
72 fourth controller
80 service station
81 second communication module
83 memory
84 CPU
90 service module
91 third communication module
92 third controller
99 means for carrying out a service action
95 first service module
951 cleaning robot
952 cleaning robot
953 stop position
100 operating area
200 tool for identifying dirtiness
201 vapor emitter
202 light source
203 optical sensor
300 vehicle window
301 operating element
302 display
303 rearview mirror

The invention claimed is:

1. A service station for vehicles of an autonomous vehicle fleet, comprising:
at least one service module configured to receive and process information regarding a type and degree of dirt of at least one vehicle component of a vehicle of the vehicle fleet; and
at least one mobile robot apparatus, operatively coupled to the at least one service module, wherein the at least one mobile robot apparatus comprises a tool for identifying the type and degree of dirt of the at least one vehicle component, the tool being configured on the mobile robot apparatus, and wherein the tool comprises at least one light source configured to emit light of different wavelengths, and at least one optical sensor, wherein the at least one optical sensor is configured to utilize spatially resolved and frequency-resolved reflectance data across multiple spectral bands to detect the type and degree of dirt from a plurality of different dirt types based on wavelength-dependent variations in the spectral characteristics of light reflected from the at least one vehicle component, wherein the at least one service module is configured to execute a control algorithm that analyzes the light reflections detected by the at least one optical sensor to determine cleaning parameters based on the identified type and degree of dirt, and is further configured to adjust at least one cleaning parameter, the at least one cleaning parameter comprising selecting a specific cleaning tool or cleaning chemical, based on the identified type and degree of dirt.

2. The service station of claim 1, wherein the at least one optical sensor is configured to record at least one image signal of the at least one vehicle component of the vehicle.

3. The service station of claim 2, wherein the at least one optical sensor is configured to detect a degree of reflection of at least one surface of the at least one vehicle component.

4. The service station of claim 1, wherein the tool comprises at least one vapor emitter.

5. The service station of claim 1, wherein the tool comprises at least one moisture sensor and/or air quality sensor.

6. The service station of claim 1, further comprising a cleaning tool for performing interior cleaning of at least one vehicle component, the cleaning tool being configured on the mobile robot apparatus, wherein the cleaning tool comprises at least one of a vacuum cleaner nozzle, an upholstery brush and/or an applicator for applying cleaning agent.

7. The service station of claim 1, further comprising a communication module configured to communicate with at least one of other vehicles of the autonomous vehicle fleet and/or a server of a fleet operator, wherein the communication module comprises:
    a controller configured to process information regarding the type and degree of dirt on the at least one vehicle component of the vehicle for controlling the mobile robot apparatus and/or the tool,
    wherein the communication module is configured to transmit a first message indicating the type and degree of dirt detected on the at least one vehicle component and to receive a second message comprising information regarding the type and degree of dirt on the at least one vehicle component.

8. A service station for vehicles of an autonomous vehicle fleet, comprising:
    at least one mobile robot apparatus, comprising an optical tool for identifying a type and degree of dirt of at least one vehicle component, the optical tool comprising at least one light source configured to emit light of different wavelengths and at least one optical sensor, and wherein the optical tool is configured on the mobile robot apparatus, wherein the at least one optical sensor is configured to utilize spatially resolved and frequency-resolved reflectance data across multiple spectral bands to detect the type and degree of dirt from a plurality of different dirt types based on wavelength-dependent variations in the spectral characteristics of light reflected from the at least one vehicle component;
    at least one service module, operatively coupled to the at least one robot apparatus, configured to process the type and degree of dirt of the at the least one vehicle component of a vehicle of the vehicle fleet,
    wherein the at least one service module is configured to execute a control algorithm that analyzes the light reflections detected by the at least one optical sensor to determine cleaning parameters based on the identified type and degree of dirt, and is further configured to adjust at least one cleaning parameter, the at least one cleaning parameter comprising selecting a specific cleaning tool or cleaning chemical, based on the identified type and degree of dirt; and
    a cleaning tool, operatively coupled to the at least one service module, wherein the at least one service module is configured to carry out a cleaning action based on the selected cleaning parameters.

9. The service station of claim 8, wherein the at least one optical sensor is configured to record at least one image signal of the at least one vehicle component of the vehicle, wherein the at least one optical sensor is further configured to detect a degree of reflection of at least one surface of a vehicle component.

10. The service station of claim 8, wherein the optical tool comprises at least one vapor emitter.

11. The service station of claim 8, wherein the optical tool comprises at least one moisture sensor and/or air quality sensor.

12. The service station of claim 8, further comprising a cleaning tool for performing interior cleaning of at least one vehicle component, the cleaning tool being configured on the mobile robot apparatus, wherein the cleaning tool comprises at least one of a vacuum cleaner nozzle, an upholstery brush and/or an applicator for applying cleaning agent.

13. The service station of claim 8, further comprising a communication module configured to communicate with at least one of other vehicles of the autonomous vehicle fleet and/or a server of a fleet operator, wherein the communication module comprises a controller configured to identify the type and degree of dirt of at least one vehicle component of the vehicle and for controlling the mobile robot apparatus and/or the optical tool.

14. A method for using a service station and preparing at least one vehicle component for cleaning for vehicles of an autonomous vehicle fleet, the method comprising:
    receiving and processing, by at least one service module of the service station, information regarding a type and degree of dirt of at least one vehicle component of a vehicle of the vehicle fleet; and
    utilizing, by at least one mobile robot apparatus, operatively coupled to the at least one service module, a tool configured on the mobile robot apparatus to identify the type and degree of dirt of the at least one vehicle component, wherein the tool comprises at least one light source configured to emit light of different wavelengths, and at least one optical sensor;
    detecting, via the at least one optical sensor, the type and degree of dirt from a plurality of different dirt types utilizing spatially resolved and frequency-resolved reflectance data across multiple spectral bands comprising wavelength-dependent variations in the spectral characteristics of light reflected from the at least one vehicle component; and
    executing, via the at least one service module, a control algorithm that analyzes the light reflections detected by the at least one optical sensor to determine cleaning parameters based on the identified type and degree of dirt, and adjusting at least one cleaning parameter, the at least one cleaning parameter comprising selecting a specific cleaning tool or cleaning chemical, based on the identified type and degree of dirt.

15. The method of claim 14, wherein the identifying of the type and degree of dirt of the at least one vehicle component comprises detecting, by the at least one optical sensor, the type and degree of dirt based on the spectral characteristics of light reflected from the at least one vehicle component.

16. The method of claim 15, wherein detecting the type and degree of dirt comprises recording, by the at least one optical sensor, at least one image signal of the at least one vehicle component of the vehicle, and detecting the spectral characteristics comprising a degree of reflection of at least one surface of a vehicle component.

17. The method of claim 14, wherein the tool comprises at least one vapor emitter.

18. The method of claim 14, wherein the tool comprises at least one moisture sensor and/or air quality sensor.

19. The method of claim 14, further comprising performing interior cleaning of at least one vehicle component using the cleaning tool configured on the mobile robot apparatus, wherein the cleaning tool comprises at least one of a vacuum cleaner nozzle, an upholstery brush and/or an applicator for applying cleaning agent.

20. The method of claim 14, further comprising:
communicating, by a communication module of the service station, with at least one of other vehicles of the autonomous vehicle fleet and/or a server of a fleet operator;
identifying, by a controller of the communication module, the type and degree of dirt of at least one vehicle component of the vehicle for controlling the mobile robot apparatus and/or the tool;
transmitting, by the communication module, a first message indicating the type and degree of dirt of at least one vehicle component; and
receiving, by the communication module, a second message comprising information regarding the type and degree of dirt of at least one vehicle component.

* * * * *